United States Patent
Swan et al.

(10) Patent No.: US 10,145,507 B2
(45) Date of Patent: Dec. 4, 2018

(54) WEARABLE SUPPORT SYSTEM FOR LOAD DISTRIBUTION

(71) Applicant: S&S Precision, LLC, Virginia Beach, VA (US)

(72) Inventors: Johnny E. Swan, Virginia Beach, VA (US); Andrew C. Borland, Virginia Beach, VA (US); William-Joseph Basan Elizalde, Virginia Beach, VA (US)

(73) Assignee: S&S Precision, LLC, Virginia Beach, VA (US)

( * ) Notice: Subject to any disclaimer, the term of this patent is extended or adjusted under 35 U.S.C. 154(b) by 0 days.

(21) Appl. No.: 15/997,786

(22) Filed: Jun. 5, 2018

(65) Prior Publication Data

US 2018/0283607 A1    Oct. 4, 2018

Related U.S. Application Data

(63) Continuation of application No. 14/989,468, filed on Jan. 6, 2016, now Pat. No. 9,995,431.

(51) Int. Cl.
| | |
|---|---|
| *F41H 1/00* | (2006.01) |
| *F16M 13/04* | (2006.01) |
| *A45F 3/00* | (2006.01) |
| *F41H 5/013* | (2006.01) |
| *A41D 13/05* | (2006.01) |
| *A45F 3/06* | (2006.01) |

(52) U.S. Cl.
CPC ......... *F16M 13/04* (2013.01); *A41D 13/0518* (2013.01); *A45F 3/005* (2013.01); *F41H 5/013* (2013.01); *A45F 3/06* (2013.01); *A45F 2200/0575* (2013.01); *A45F 2200/0591* (2013.01); *F41H 1/00* (2013.01)

(58) Field of Classification Search
CPC ... F16M 13/04; A41D 13/05818; A45F 3/005; A45F 3/06; A45F 2200/0575; A45F 2200/0591; A45F 3/08; A45F 3/10; A45F 3/14; F41H 1/00; F41H 1/02; F41H 5/013
See application file for complete search history.

(56) References Cited

U.S. PATENT DOCUMENTS

| | | | | |
|---|---|---|---|---|
| 4,911,346 A * | 3/1990 | Shallman | ...... | A45F 3/08 224/153 |
| 5,503,314 A * | 4/1996 | Fiscus | ...... | A45F 3/08 224/262 |
| 5,954,250 A * | 9/1999 | Hall | ...... | A45F 3/08 224/262 |
| 8,176,569 B2 * | 5/2012 | Rock | ...... | F41H 1/02 2/2.5 |

(Continued)

*Primary Examiner* — Corey Skurdal
(74) *Attorney, Agent, or Firm* — Tanner IP, PLLC (57) ABSTRACT

A wearable load redistribution system can include a base support structure and a thoracic frame configured to surround an upper torso of a wearer of the system. The base support structure can include a support frame and a plurality of support members disposed at distal ends of the support frame. The thoracic frame can include a coupling structure, a front plate, and a plurality of struts. A connector member can removably connect the coupling structure to the support frame. The plurality of struts is mated to the front plate to redistribute a weight of the front plate away from shoulders of the wearer and towards the base support structure.

20 Claims, 8 Drawing Sheets

(56) References Cited

U.S. PATENT DOCUMENTS

| | | | | |
|---|---|---|---|---|
| 8,182,439 | B2* | 5/2012 | Glenn | F41H 1/02 |
| | | | | 224/637 |
| 8,584,917 | B2* | 11/2013 | Hexels | A45F 3/08 |
| | | | | 2/102 |
| 9,220,625 | B2* | 12/2015 | Ingimundarson | A61F 5/024 |
| 9,222,757 | B2* | 12/2015 | Seuk | F41H 1/02 |
| 9,504,307 | B1* | 11/2016 | Burnett | A45F 3/10 |
| 2005/0082330 | A1* | 4/2005 | Fehlberg | A45F 3/047 |
| | | | | 224/631 |
| 2006/0208024 | A1* | 9/2006 | Gleason, Jr. | A45F 3/08 |
| | | | | 224/633 |
| 2010/0294820 | A1* | 11/2010 | Neibarger | A45F 3/00 |
| | | | | 224/576 |
| 2011/0297721 | A1* | 12/2011 | Cromie | A45F 5/02 |
| | | | | 224/660 |
| 2012/0192335 | A1* | 8/2012 | Crye | A41D 13/0007 |
| | | | | 2/102 |
| 2013/0042376 | A1* | 2/2013 | Hexels | A45F 3/06 |
| | | | | 2/2.5 |
| 2013/0047320 | A1* | 2/2013 | Gleason | F41H 1/02 |
| | | | | 2/312 |
| 2013/0256358 | A1* | 10/2013 | Beck | F41H 1/02 |
| | | | | 224/641 |
| 2014/0224849 | A1* | 8/2014 | Hiemenz | A45F 3/04 |
| | | | | 224/271 |

* cited by examiner

WEARABLE SUPPORT SYSTEM FOR LOAD DISTRIBUTION

RELATED APPLICATIONS

This application is a continuation application of U.S. application Ser. No. 14/989,468 filed Jan. 6, 2016, now U.S. Pat. No. 9,995,431, the contents of which are hereby incorporated by reference in their entirety.

BACKGROUND

When an individual carries a load, the load can cause great burden on the individual's body. For example, in military operations, military personnel traditionally wear protective gear (e.g., flak jackets) that protects the military personnel's body from projectile objects (e.g., bullets, shrapnel, and the like). However, the protective gear can be relatively heavy. The heavy protective gear, in addition to other objects to be carried (e.g., ammunition, body armor, a water canister, and the like), place significant weight on the shoulders of the military personnel. Military personnel can quickly become exhausted when performing exercises or drills while wearing the protective gear. Further, traditional protective gear can limit the wearer's range of motion.

SUMMARY

This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter.

Embodiments of the present disclosure include a wearable load redistribution system. The system can include a base support structure and a thoracic frame. The base support structure can include a support frame and a plurality of support members disposed at distal ends of the support frame. The thoracic frame can include a coupling structure, a front plate, and a plurality of struts. The thoracic frame can be configured to surround an upper torso of a wearer of the system and to redistribute a weight of the front plate away from shoulders of the wearer and towards the base support structure. A connector member can be adapted to removably connect the coupling structure to the support frame.

In certain embodiments, the coupling structure may further include a back plate and an extension frame. The extension frame may be formed to protrude outward from a lower portion of the back plate. Further, the plurality of struts may be coupled to the extension frame.

In an example embodiment, each of the plurality of struts can be mated to the front plate, such that a weight of the front plate is supported by the plurality of struts.

In some examples, one or more additional objects may be removably connected to at least one strut of the plurality of struts, such that a weight of the front plate and the one or more additional objects is supported by the plurality of struts.

According to some embodiments, each of the plurality of struts may traverse a space between the coupling structure and the front plate, such that each strut partially surrounds a thorax of the wearer.

In some embodiments, the plurality of struts can include a first strut and a second strut. The first strut can be configured to traverse a first side of the wearer and the second strut can be configured to traverse a second side of the wearer. Each of the first strut and second right strut may be substantially rigid.

According to at least one example, the first strut may be moveably coupled to a first edge surface of the extension frame and the second strut is moveably coupled to a second edge surface of the extension frame.

In one example, the connector member may be flexibly biased and removably coupled to the support frame at a single point.

In other embodiments, the connector member may be rotatably coupled to the extension frame. The thoracic frame can be rotatable along a guide path. The guide path may be formed in the extension frame.

The base support structure can be configured to at least partially surround a lower torso of the wearer. The front plate can be configured to cover a chest of the wearer. The coupling structure can be configured to cover a backside of the wearer. The coupling structure and the front plate can be separated by a gap and substantially parallel to each other. The plurality of struts may include a left strut and a right strut. The left strut may be configured to extend under a left arm of the wearer and the right strut may be configured to extend under a right arm of the wearer, such that each of the left and right struts can traverse the gap between the coupling structure and the front plate.

Embodiments of the present disclosure additionally include a wearable load distribution apparatus. For example, the apparatus can include a front shield and a back shield. The front shield can include a solid plate. The back shield can include an additional solid plate. The front shield can be disposed opposite to the back shield, such that there is a space between the front shield and the back shield. The apparatus can also include a first rigid strut and a second rigid strut. Each of the first rigid strut and the second rigid strut can traverse the space between the front shield and the back shield. A first end of each of the first and second rigid struts can be coupled to the back shield. Further, a second end of each of the first and second rigid struts can be mated to the front shield, such that a weight of the front shield is supported by the first and second rigid struts. The apparatus can include a base support frame and a connector member. A first end of the connector member may be removably coupled to the back shield and a second end of the connector member may be removably coupled to the base support frame.

In one embodiment, the front shield can include a front frame. For example, the front frame can surround the solid plate of the front shield. The first and second rigid struts may be coupled to the front frame.

The first rigid strut can be configured to traverse a first side of a wearer of the apparatus and the second rigid strut can be configured to traverse a second side of the wearer.

The back shield can include a back frame. The back frame can surround the additional solid plate of the back shield. The first and second rigid struts may each be coupled to the back frame.

Each of the first and second rigid struts can be mated to the solid plate of the front shield.

Embodiments of the present disclosure additionally include a wearable load support system. The system can include a chest guard configured to surround a wearer's chest and a back guard configured to surround the wearer's backside. The system can also include a plurality of rigid members including a first rigid member and a second rigid member. A first end of each rigid member can be coupled to the back guard. A second end of each rigid member can be mated to the chest plate. The first rigid member can traverse a first side region of the wearer's chest and the second rigid member can traverse a second side region of the wearer's chest.

The system can further include a base support structure connected to the back guard at a single point via a connector member. The base support structure at least partially surrounds a lower torso of the wearer.

The chest guard and the back guard can each include at least one plate and at least one frame. Each of the plurality of rigid members can be mated to the at least one frame of the chest guard, such that a weight of the chest guard is supported by the plurality of rigid members.

The chest guard and the back guard may be disposed opposite to each other, such that there is a gap between the chest guard and the back guard. A size of the gap between the chest guard and the back guard can be adapted to fit the chest of the wearer.

Each of the plurality of rigid members may traverse the gap between the chest guard and the back guard.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

Certain aspects and features of the present disclosure relate to a wearable load redistribution system, which can be worn around the hips and thorax of a wearer. The wearable load redistribution system can include a plurality of struts that protrude out of a back plate structure and that are mated to a front plate structure. The weight of the front plate structure can be supported by the plurality of struts, such that the weight of the front plate structure is redistributed to the wearer's hips and away from the wearer's shoulders. Further, the wearable load distribution system can enable a wide range of motion of the wearer's upper torso.

In addition, certain aspects and features of the present disclosure relate to a wearable load distribution system that can include a front plate configured to surround the wearer's chest, a back plate configured to surround the wearer's back, and a base support structure that is configured to surround the wearer's hips. The back plate can be connected to the base support structure. Further, the wearable load distribution system can include a plurality of struts that extend underneath the arms of the wearer to connect the front plate to the back plate. The plurality of struts can support the weight of the front plate (and the weight of a load connected to the wearable load distribution system) and redistribute the weight of the front plate and any load to the hips of the wearer.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

Figure 1:
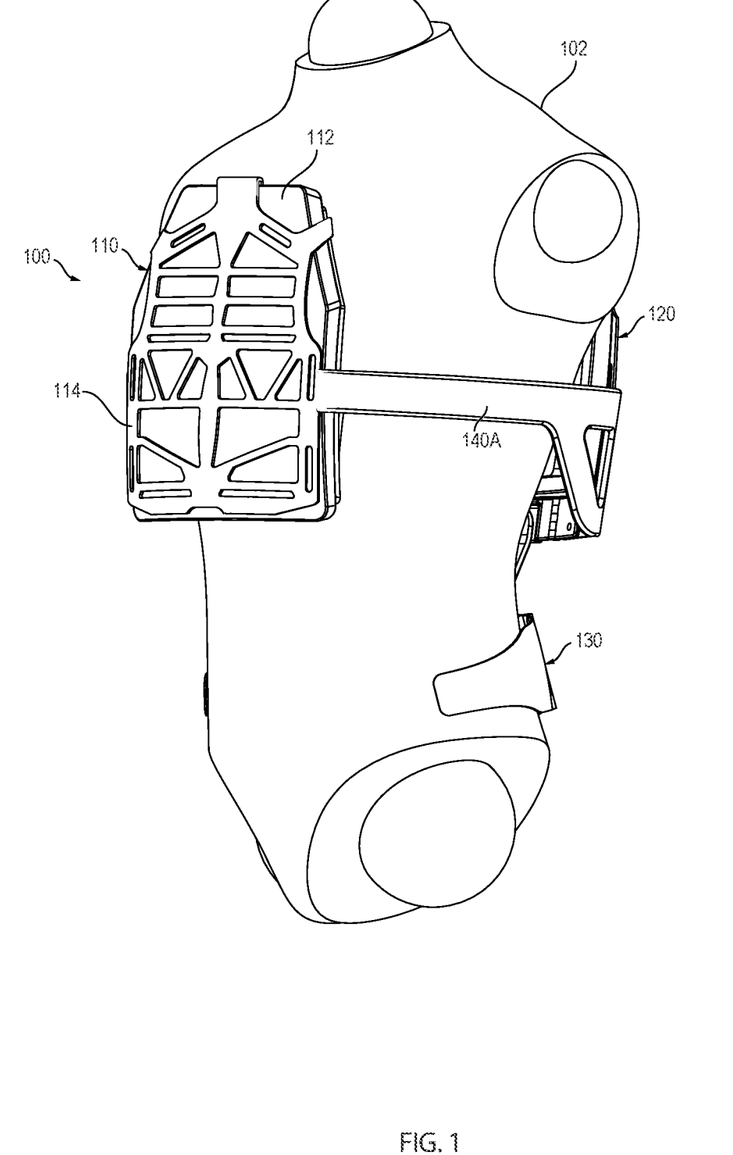
FIG. 1 is a perspective view of a wearable load redistribution system according to certain aspects of the present disclosure.

FIG. 1 is a perspective view of wearable load redistribution system 100 according to certain aspects of the present disclosure. Wearable load redistribution system 100 can be worn around a thorax region (e.g., upper torso) of a wearer 102. Wearable load redistribution system 100 can redistribute a load such that the load is alleviated from shoulders of wearer 102 and redistributed to hips of wearer 102. In some embodiments, the load can be a weight of the front plate structure 110. In other embodiments, the load can be a weight of one or more additional objects (e.g., a water canister, ammunition, first aid kit, and other suitable objects) attached to wearable load redistribution system 100. For example, a load can be attached (e.g., hung from or mounted to) a strut (e.g., strut 140), as further discussed below.

In certain embodiments, wearable load redistribution system 100 may be a structural system. As such, wearable load redistribution system can be covered by various fabrics or padding so that none of, or only a portion of, wearable load redistribution system 100 is exposed when worn. In some embodiments, wearable load redistribution system 100 can include front plate structure 110, coupling structure 120, base support structure 130, and a plurality of struts 140.

Figure 2:
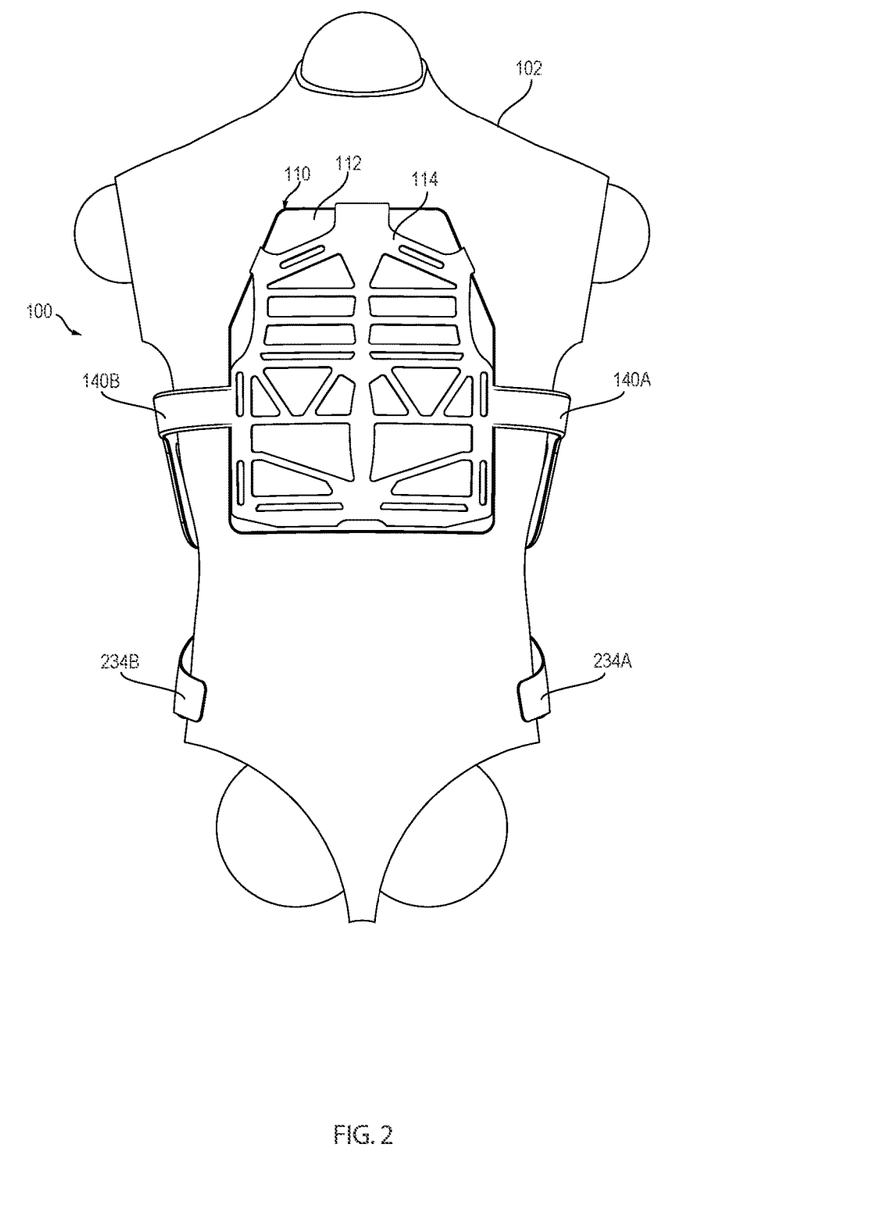
FIG. 2 is another perspective view of the wearable load redistribution system of FIG. 1 according to certain aspects of the present disclosure.
Figure 3:
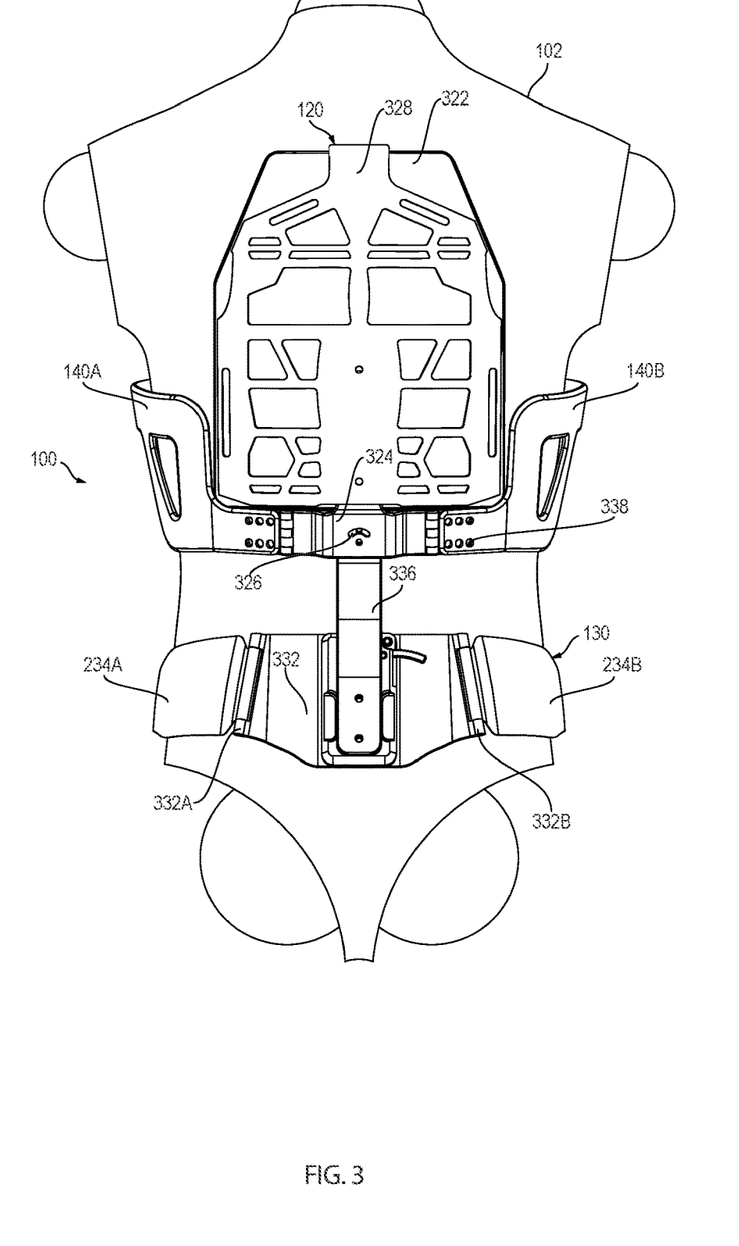
FIG. 3 is another perspective view of the wearable load redistribution system of FIG. 1 according to certain aspects of the present disclosure.

According to some embodiments, the plurality of struts 140A and 140B (as shown in FIG. 2) can be rigidly formed and can traverse a space between coupling structure 120 and front plate structure 110. For example, a strut 140 can protrude outward from coupling structure 120 towards front plate structure 110. Further, a first end of strut 140 can be coupled to coupling structure 120 (as shown in FIG. 3) and a second end of strut 140 can be mated to front plate structure 110 (as shown in FIG. 2). The plurality of struts 140 can extend under the arms of wearer 102. Moreover, the plurality of struts 140 can be slightly curved so as to create space for the chest of wearer 102. For example, strut 140 can be formed to have a curve similar to a curve of ribs of wearer 102.

Mating the plurality of struts 140 to front plate structure 110 and adapting the plurality of struts so that they are disposed under the arms of wearer 102 can provide support for the weight of front plate structure 110 without any weight being placed on the shoulders of wearer 102. For example, the plurality of struts can support the weight of front plate structure 110, such that the weight is redistributed away from the shoulders of wearer 102 and transferred to the hips of wearer 102 (via coupling structure 120 and base support structure 130). As used herein, the plurality of struts can also be referred to as rigid struts and rigid members.

Front plate structure 110 can include front plate 112 and front frame 114. Front plate structure 110 can surround a front portion of the upper torso of wearer 102. For example, front plate structure 110 can cover the chest of wearer 102, as illustrated in FIG. 1. According to embodiments, front plate 112 can protect the chest of wearer 102 from projectile objects (e.g., bullets, shrapnel, and the like). For example, front plate 112 can be a ballistic plate or other suitable bullet-proof material. A ballistic plate can include several layers of Kevlar and one or more layers of steel. In some cases, front plate 112 can be an insertable plate that can be inserted into front frame 114. For example, front plate 112 can be inserted into an open portion of front frame 114 at the top portion of front frame 114. In some cases, front frame 114 can be made of a metal or metal alloy material. In other cases, front frame 114 can be made from a plastic material or a firm material derived from a plastic. Front frame 114 can support and surround front plate 112 so that front plate 112 is prevented from shifting due to motion of wearer 102. In other embodiments, front plate 112 and front frame 114 can be fused together. For example, front plate 112 and front frame 114 can be coupled together by an adhesive or a fixture, such as a screw. As used herein, the terms "front shield" and "chest guard" generally refer to a front plate structure, such as, for example, front plate structure 110.

Coupling structure 120 can surround the rear side of the upper torso of wearer 102. For example, coupling structure 120 can cover the back, including the spine, of wearer 102. One end of strut 140 can be coupled to coupling structure 120 (as shown in FIG. 3). For example, strut 140 can be coupled to coupling structure 120 by a fixing member, such as a screw. Strut 140 traverses a space between front plate structure 110 and coupling structure 120 by protruding outward from coupling structure 120 (under the arms of wearer 102) and being mated with front plate structure 110. Coupling structure 120 can support a weight of front plate structure 110 without any force of the weight being placed on shoulders of wearer 102 by redistributing the force of the cantilevered weight at the plurality of struts to base support structure 130. As used herein, the terms "back shield" and "back guard" generally refer to a coupling structure, such as, for example, coupling structure 120.

Base support structure 130 can surround the hips of wearer 102. Base support structure 130 can also be coupled to coupling structure 120 (as described below with reference to FIG. 3). The gravitational force of the weight associated with front plate structure 110 can be supported by the plurality of struts 140, which are coupled to coupling structure 120. Coupling structure 120 can redistribute the gravitational force of the weight associated with front plate structure 110 so that the weight is supported by the hips of wearer 102 at base support structure 130.

Wearable load redistribution system 100 can be formed or manufactured by coupling each of the plurality of struts to coupling structure. In certain embodiments, protruding ends of the plurality of struts can be mated with front frame 114. A connector member (discussed later herein) can be removeably coupled to both coupling structure 120 and base support structure 130. For example, the connector member can be fixed to both coupling structure 120 and base support structure 130 by fixing members (e.g., screws). The weight of front plate structure 110 can be transferred to the hips of wearer 102 through the base support structure 130.

FIG. 2 is another perspective view of wearable load redistribution system 100 of FIG. 1 according to certain aspects of the present disclosure. FIG. 2 illustrates a view of a front side of wearer 102 and wearable load redistribution system 100. The front side of wearer 102 can include the chest and abdomen area of wearer 102.

The plurality of struts 140 can include strut 140A and strut 140B. Strut 140A can traverse a space under a left arm of wearer 102. Strut 140B can traverse a space under a right arm of wearer 102. In some embodiments, each of strut 140A and strut 140B can be mated to front plate structure 110. For example, each of strut 140A and strut 140B can be mated to front frame 114. Each of strut 140A and 140B can be mated to front frame 114 by fusing the ends of strut 140A and 140B with edges of front frame 114. For example, strut 140A can be welded to an edge of front frame 114. In other embodiments, each of strut 140A and 140B can be mated to front plate 112 in a permanent manner. Further, each of strut 140A and strut 140B can also be coupled to coupling structure 120. For example, one end of strut 140A can be coupled to coupling structure 120 and the other end of strut 140A can be mated to front frame 114.

Wearable load redistribution system 100 can include a plurality of support members 234A and 234B. In certain embodiments, support members 234A and 234B can be formed in the shape of rotatable extension flaps. Further, support members 234A and 234B can be curved so as to surround the hips of wearer 102. Support members 234A and 234B can be coupled to base support structure 130, as described further herein and as illustrated in FIG. 3. In some embodiments, support members 234A and 234B can partially surround the hips of wearer 102. For example, as illustrated in the example embodiment of FIG. 2, support members 234A and 234B can surround the hips of wearer 102. In other embodiments, support members 234A and 234B can completely surround the hips of wearer 102. For example, support member 234A can be mated with support member 234B, such that the hips of wearer 102 are completely surrounded by support members 234A and 234B.

The weight of front plate 112 can be supported by struts 140A and 140B without placing any force on the shoulders of wearer 102. Struts 140A and 140B may be coupled to coupling structure 120 and can protrude outward under the arms of wearer 102. For example, struts 140A and 140B can protrude outward towards front plate structure 110. Mating struts 140A and 140B provides support for the weight of front plate structure 110.

In some embodiments, additional objects can be connected to struts 140A and 140B. For example, the additional objects can be hung from at least one of struts 140A and 140B using one or more clamps. Further, the weight of the additional objects can also be supported by struts 140A and 140B without placing any force on the shoulders of wearer 102. For example, wearable load redistribution system 100 can redistribute the weight of front plate structure 110 and any additional objects hung from struts 140A and 140B to the hips of wearer 102.

FIG. 3 is another perspective view of wearable load redistribution system 100 according to certain aspects of the present disclosure. FIG. 3 illustrates a view of wearable load redistribution system 100 from a back or rear side of wearer 102. The back or rear side of wearer 102, as shown in the example of FIG. 3, can include a rear side of the upper torso of wearer 102, which may include the spine and shoulders.

Wearable load redistribution system 100 can include coupling structure 120, connector member 336, and base support structure 130. Connector member 336 can be coupled to both coupling structure 120 and base support structure 130 so as to connect coupling structure 120 to base support structure 130. As illustrated in the example of FIG. 3, one end of connector member 336 can be coupled to base support structure 130 and the other end of connector member 336 can be coupled to coupling structure 120. Further, connector member 336 can be detached from base support structure 130 and coupling structure 120 so that wearer 102 can achieve greater range of motion.

Coupling structure 120 can include back plate 322, back plate frame 328, and extension frame 324. Back plate 322 can be a ballistic plate that protects wearer 102 from projectile objects, such as bullets and shrapnel. Back plate frame 328 can include a frame or bracket that surrounds back plate 322 such that back plate 322 is kept firmly in place. For example, back plate frame 328 can be a metallic frame that is adapted to fit around back plate 322. In some examples, back plate 322 can be insertable into back plate frame 328. In other examples, back plate frame 328 can be formed such that protrusion clamps (illustrated in FIG. 6) of back plate frame 328 surround the edge of back plate 322 to hold back plate 322 in place.

In accordance with certain embodiments, extension frame 324 can protrude outward from a lower portion of back plate frame 328. Further, extension frame 324 can couple the plurality of struts 140A and 140B to back plate frame 328. For example, extension frame 324 can include fixture holes 338 through which fixtures (e.g., screws) can be placed to couple extension frame 324 to struts 140A and 140B.

Extension frame 324 can also include guide path 326. Guide path 326 can include a curved hole in extension frame 324. In some embodiments, guide path 326 can allow coupling structure 120 to swivel relative to base support structure 130. For example, wearer 102 can experience greater range of motion due to the ability to swivel coupling structure 120 relative to base support structure 130. One end of connector member 336 can be coupled to base support structure 130 and the other end of connector member 336 can be coupled to extension frame 324. Connector member 336 can include a protrusion at the end that is coupled to extension frame 324. The protrusion of connector member 336 can be fitted into guide path 326. Coupling structure 120 can swivel relative to base support structure 130 by guiding the protrusion through guide path 326.

Base support structure 130 can include support frame 332 and support members 234A and 234B. Support members 234A and 234B can each be rotatably coupled at distal ends of support frame 332. For example, support member 234A can be coupled to a left edge 332A of support frame 332 and support member 234B can be coupled to a right edge 332B of support frame 332. Support member 234A can rotate along left edge 332A and support member 234B can rotate along right edge 332B. Further, support members 234A and 234B can surround the hips of wearer 102, and support frame 332 can cover the base of the spine of wearer 102.

Wearable load redistribution system 100 can redistribute the weight of front plate structure 110, coupling structure 120, and any additional objects connected to struts 140A and 140B so that the total weight is supported at the hips of wearer 102, and not at the shoulders of wearer 102. For example, the weight of front plate structure 110, which is supported by struts 140A and 140B, can be redistributed to the point at which connector member 336 is coupled to support frame 332.

Figure 4:
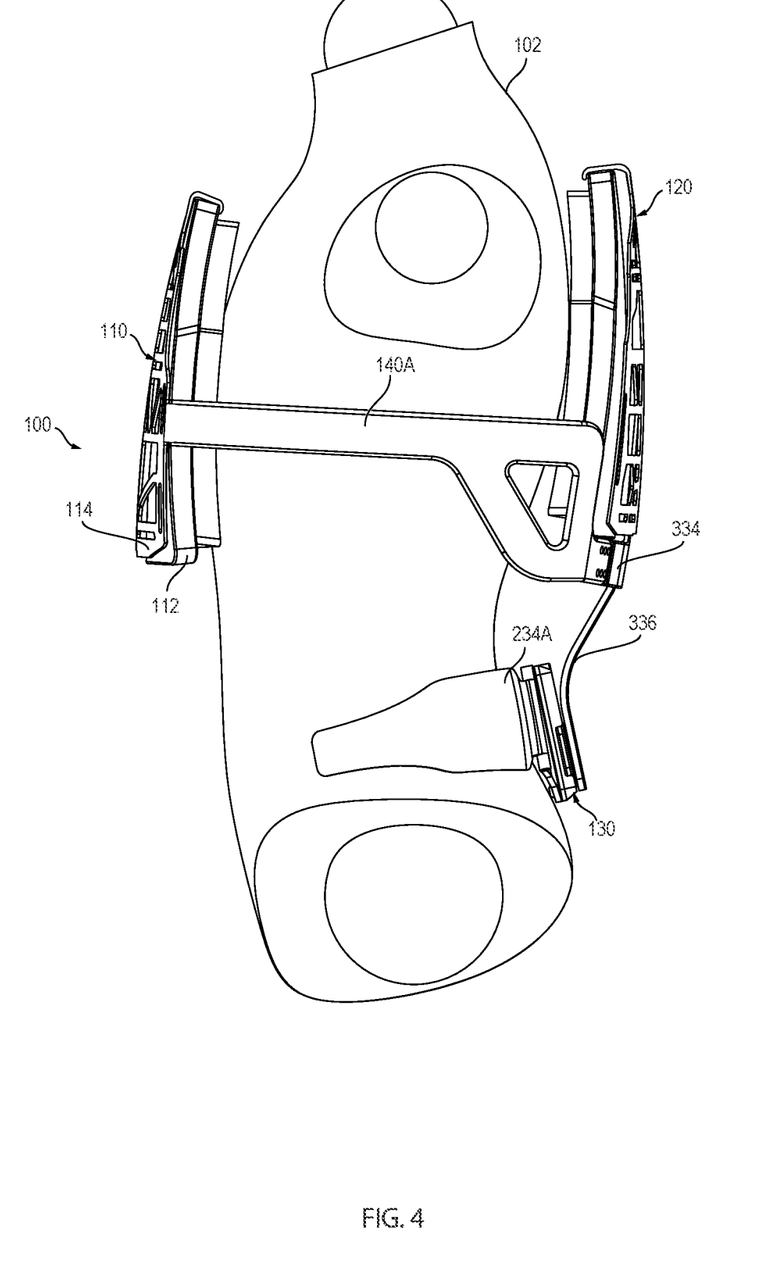
FIG. 4 is another perspective view of the wearable load redistribution system of FIG. 1 according to certain aspects of the present disclosure.

FIG. 4 is another perspective view of wearable load redistribution system 100 according to certain aspects of the present disclosure. FIG. 4 illustrates a view of wearable load redistribution system 100 from a left side of wearer 102. The left side of wearer 102, as shown in the example of FIG. 4, can include a left arm and left hip of wearer 102.

As discussed above, wearable load redistribution system 100 can include front plate structure 110, coupling structure 120, base support structure 130, and a plurality of struts 140A and 140B. The weight of front plate structure 110 can be supported by struts 140A and 140B, which are each coupled to extension frame 324. Wearable load redistribution system 100 can redistribute the weight of front plate structure 110 away from the shoulders of wearer 102 and towards the contact point of connector member 336. For example, the plurality of struts 140A and 140B are mated to front frame 114 so that the force of the weight of front plate structure 110 is redistributed away from the shoulders of wearer 102. Further, the plurality of struts 140A and 140B are each coupled to extension frame 324. Extension frame 324 is coupled to base support structure 130 by connector member 336. Connector member 336 is coupled to base support structure 130 at a single point on support frame 332. Accordingly, the weight of front plate structure 110 can be supported at the single point of support frame 332 at which connector member 336 is coupled. The weight of wearable load redistribution system 100 can be supported at the hips of wearer 102. Support members 234A and 234B can be structure elements of wearable load redistribution system 100.

It will be appreciated that support members 234A and 234B can be attached to a belt that completely surrounds the waist of wearer 102. It will also be appreciated that wearable load redistribution system 100 can include shoulder straps, however, the gravitational force of the weight of the wearable load redistribution system 100 would nonetheless be supported by the hips or waist of wearer 102. In addition, it will be appreciated that additional objects (e.g., a water canister) can be connected to struts 140A or 140B to be supported by wearable load redistribution system 100. For example, a water canister can be connected to strut 140A by a hook or clamp so that the weight of the water canister can be supported by strut 140A. In this example, the weight of wearable load redistribution system 100 and the water canister can be supported by the hips or waist of wearer 102, instead of by the shoulders of wearer 102.

Figure 5:
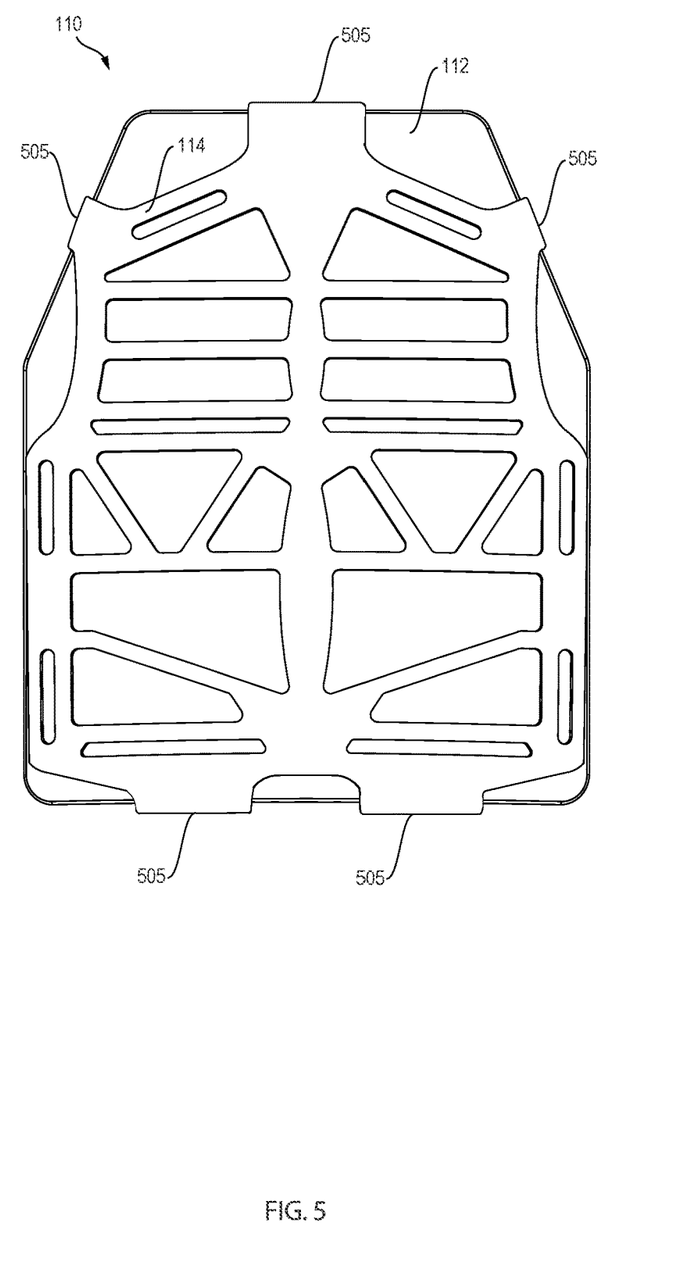
FIG. 5 is a diagram illustrating a front plate structure of a wearable load redistribution system according to certain aspects of the present disclosure.

FIG. 5 is a diagram illustrating front plate structure 110 of a wearable load redistribution system 100 according to certain aspects of the present disclosure. As discussed above, front plate structure 110 can include front plate 112 and front frame 114.

In some embodiments, front frame 114 can include clamps 505. Clamps 505 can serve to hold front plate 112 tightly in place to prevent the shifting of front plate 112 due to motion of wearer 102. Further, clamps 505 can be protrusions of front frame 114 that bend around the edge of front plate 112 to secure front plate 112 in place.

While the example illustration of FIG. 5 shows that clamps 505 are formed at the top, sides, and bottom of front frame 114, it will be appreciated that clamps 505 can be formed on front frame 114 at any position. It will also be appreciated that front frame 114 can include clamps at the bottom and sides, but not the top portion of front frame 114 to allow for the insertion of front plate 112. For example, according to some embodiments, front plate 112 can be inserted into front frame 114 and secured in place by clamps at the bottom and sides of front frame 114. It will be appreciated that the clamps on front frame 114 can be pre-formed. It will also be appreciated that the clamps on front frame 114 can be adjustable, such that wearer 102 can push the clamps to secure front plate 112 or release the clamps to remove front plate 112.

Figure 6:
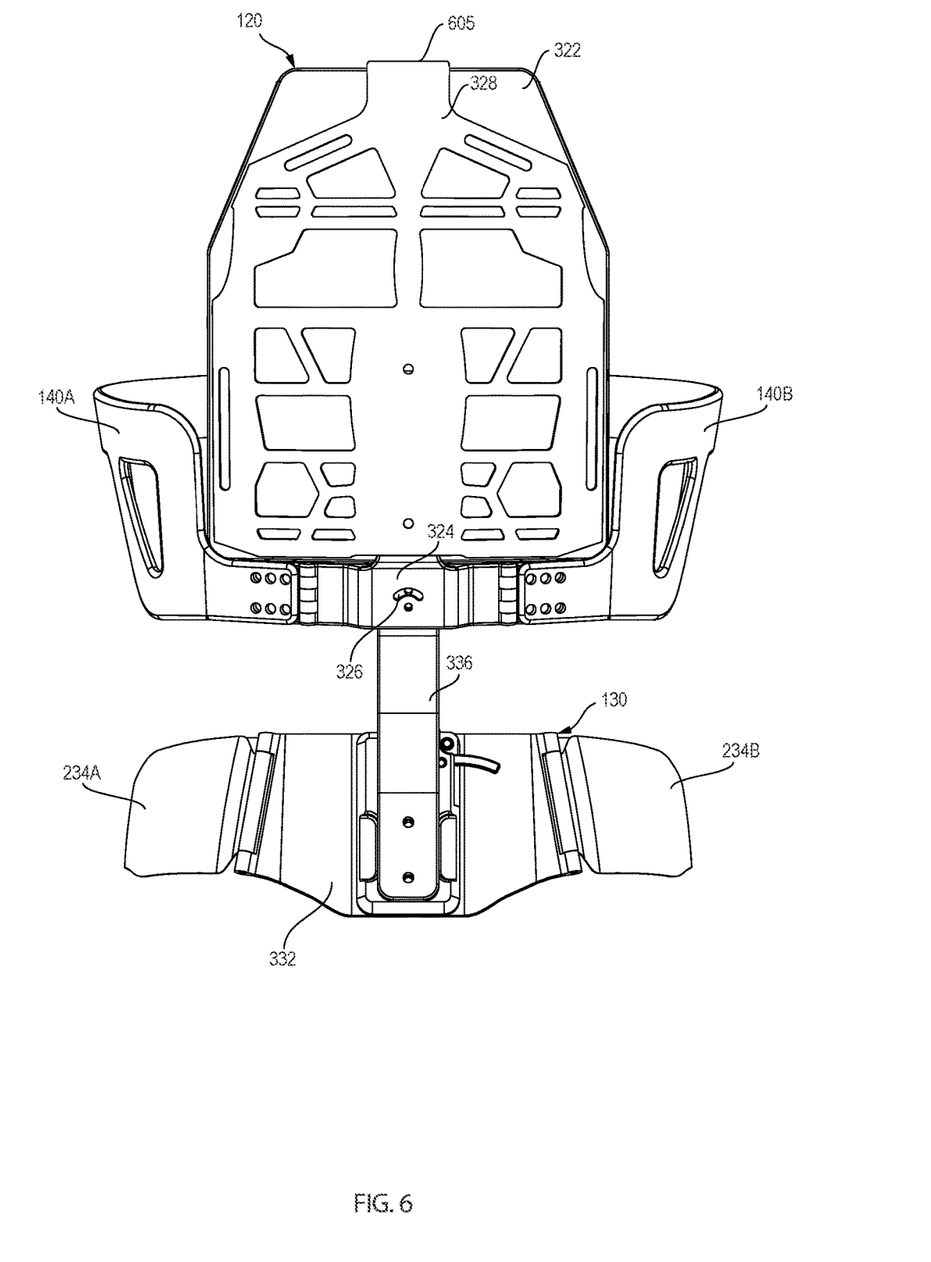
FIG. 6 is a diagram illustrating a view of a rear portion of a wearable load redistribution system according to certain aspects of the present disclosure.

FIG. 6 is a diagram illustrating a view of a rear portion of wearable load redistribution system 100 according to certain aspects of the present disclosure. As discussed above, coupling structure 120 can include back plate 322, back plate frame 328, and extension frame 324.

In some embodiments, back plate frame 328 can include clamps 605. Clamps 605 can serve to hold back plate 322 tightly in place to prevent the shifting of back plate 322 due to motion of wearer 102. Further, clamps 605 can be protrusions of back plate frame 328 that bend around the edge of back plate 322 to secure back plate 322 in place.

While the example illustration of FIG. 6 shows that clamps 605 are formed at the top of back plate frame 328, it will be appreciated that clamps 605 can be formed on back plate frame 328 at any position. It will also be appreciated that back plate frame 328 can include clamps at the bottom and sides, but not the top portion of back plate frame 328 to allow for the insertion of back plate 322. For example, in some embodiments, back plate 322 can be inserted into back plate frame 328 and secured in place by clamps at the bottom and sides of back plate frame 328. It will be appreciated that the clamps on back plate frame 328 can be pre-formed. It will also be appreciated that the clamps on back plate frame 328 can be adjustable, such that wearer 102 can push the clamps to secure back plate 322 or release the clamps to remove back plate 322 from back plate frame 328.

Figure 7:
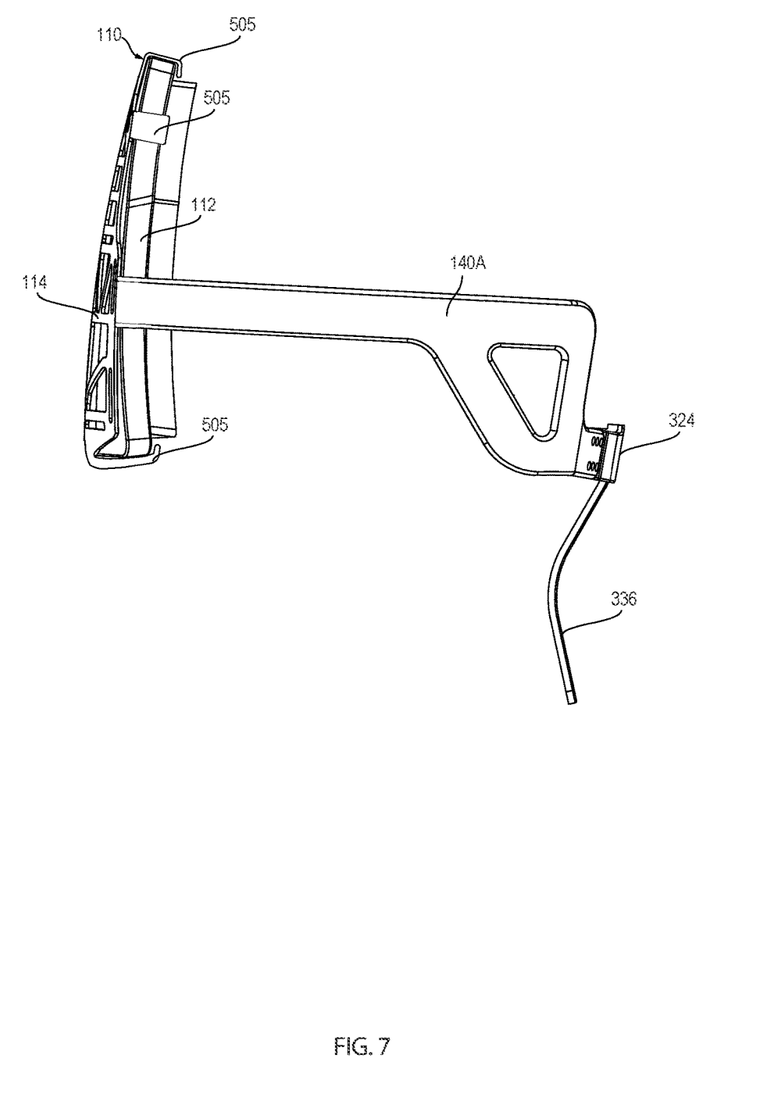
FIG. 7 is a diagram illustrating a side view of a front plate structure, a strut, and a connection member of a wearable load redistribution system according to certain aspects of the present disclosure.

FIG. 7 is a diagram illustrating a side view of front plate structure 110, strut 140A, and connector member 336 of wearable load redistribution system 100 according to certain aspects of the present disclosure. Coupling structure 120 is not illustrated in FIG. 7 for clarity of illustration.

Struts 140A and 140B can carry the load of front plate structure 110 and any additional objects hanging from strut 140A (e.g., a water canister). The weight of front plate structure 110 and any additional objects may be cantilevered at the ends of struts 140A and 140B. The cantilevered weight (e.g., the weight of front plate structure 110 and any additional objects hanging from struts 140A and 140B) can be redistributed away from the shoulders of wearer 102 and transferred to the base support structure 130. For example, the downward gravitational force of front plate structure 110 can be counteracted by the ends of struts 140A and 140B that are mated to front frame 114.

In some embodiments, connector member 336 can flexibly support the weight of front plate structure 110. For example, connector member 336 may be made of durable materials (e.g., durable plastics or metals) strong enough to support the weight of front plate structure 110. However, connector member 336 may also be flexible in that connector member 336 may be slightly compressed when supporting the weight of front plate structure 110. Further, as illustrated in the example of FIG. 7, connector member 336 may have a curved form.

Struts 140A and 140B may be rigidly formed. For example, struts 140A and 140B may be made of rigid materials that can support the weight of front plate structure 110. Struts 140A and 140B may have a narrow end and a wide end. For example, the narrow end of strut 140A can be mated with front frame 114. The wide end of strut 140A may be coupled to extension frame 324. Further, the wide end of strut 140A provides additional support for the weight of front plate structure 110.

It will be appreciated that struts 140A and 140B can have different shapes from the illustrations in FIGS. 1-7. It will also be appreciated that struts 140A and 140B can each have one or more struts. For example, strut 140A can include two or more struts traversing the space between the front plate structure 110 and the coupling structure 120.

Figure 8:
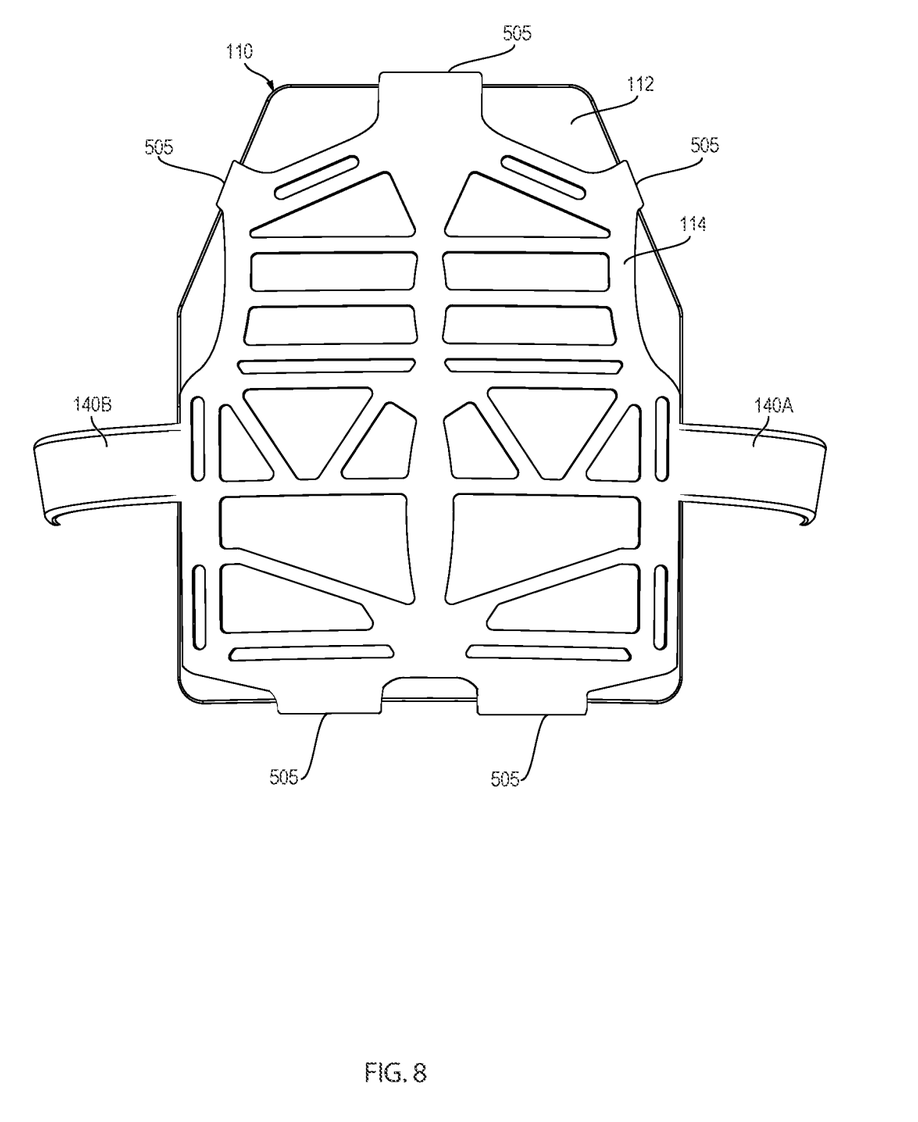
FIG. 8 is a diagram illustrating a front plate structure mated with a plurality of struts of a wearable load redistribution system according to certain aspects of the disclosure.

FIG. 8 is a diagram illustrating front plate structure 110 mated with the plurality of struts 140A and 140B of wearable load redistribution system 100 according to certain aspects of the disclosure.

In certain embodiments, struts 140A and 140B can each be mated to front frame 114. For example, strut 140A can include an end that is welded to an edge of front frame 114. As another example, strut 140A can include an end having a hook that is hooked into front frame 114. As another example, strut 140A can include one or more fixture holes into which a fixture (e.g., a screw) can be inserted or screwed to couple strut 140A to front frame 114. It will be appreciated that struts 140A and 140B can be detachably connected to front frame 114. It will also be appreciated that struts 140A and 140B can be permanently mated with front frame 114.

Mating struts 140A and 140B to front frame 114 can serve to redistribute the weight of front frame 114 (and any additional objects attached to struts 140A and 140B) away from the shoulders of wearer 102 and towards the base support structure 130 to be supported at the hips of wearer 102. Advantageously, wearer 102 can carry a heavy load while wearing wearable load redistribution system 100 without experiencing pressure on the shoulders of wearer 102.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A wearable load redistribution system comprising:
   a front carrier frame;
   a back carrier frame;
   a base support structure including a base support frame, and a plurality of base support members joined to the base support frame and configured to distribute weight from the load redistribution system to a wearer's hips;
   a thoracic frame including a plurality of rigid struts, the thoracic frame configured to at least partially surround an upper torso of the wearer under the wearer's arms, and to distribute a weight from the front carrier frame to the base support structure via the rigid struts; and
   a connector member connecting at least one of the thoracic frame and the back carrier frame to the base support frame;
   wherein the plurality of struts includes a first strut and a second strut, the first strut being configured to traverse a first side of the wearer and the second strut being configured to traverse a second side of the wearer, wherein each of the plurality of struts is mated to the front carrier frame, such that the weight of the front carrier frame is supported by the plurality of struts, and wherein at least one of the front carrier frame and the back carrier frame includes an attachment structure configured to secure an item to the at least one of the front carrier frame and the back carrier frame.

2. The system of claim 1, further comprising an extension frame that couples the plurality of struts to the back carrier frame, wherein the first strut is moveably coupled to a first end of the extension frame and the second strut is moveably coupled to a second end of the extension frame.

3. The system of claim 2, wherein the extension frame is configured to allow at least one of the back carrier frame and the plurality of struts to pivot relative to the base support structure.

4. The system of claim 1, wherein the support members of the base support structure are incorporated in a belt.

5. The system of claim 1, wherein the attachment structure is configured to allow secure attachment of a ballistic plate to the at least one of the front carrier frame and the back carrier frame.

6. The system of claim 5, wherein the attachment structure is adjustable.

7. The system of claim 1, wherein the connector member is a rigid.

8. The system of claim 1, wherein the front carrier frame, the back carrier frame, and the thoracic frame form a chest assembly, and the connector member is configured to allow a user to detach the chest assembly from the base support structure.

9. The system of claim 1, wherein a first end of the connector member is removably coupled to at least one of the back plate frame and the thoracic frame, and a second end of the connector member is removably coupled to the base support structure.

10. The system of claim 1, wherein the plurality of struts are configured to carry one or more additional items of equipment and to distribute a weight of the one or more additional items of equipment to the base support structure via the plurality of struts.

11. The system of claim 1, wherein the connector member is substantially rigid, has a curved form when viewed from the side, and is configured to be removable from the base support structure by a user.

12. The system of claim 1, further comprising a front ballistic plate carried by the front carrier frame, and a back ballistic plate carried by the back carrier frame.

13. A wearable load redistribution system comprising:
a front carrier frame;
a base support structure including a base support frame, and a plurality of base support members joined to the base support frame and configured to distribute weight from the load redistribution system to a wearer's hips;
a thoracic frame including a plurality of rigid struts, the thoracic frame configured to at least partially surround an upper torso of the wearer under the wearer's arms, and to distribute a weight from the front carrier frame to the base support structure via the rigid struts; and
a connector member connecting the thoracic frame to the base support frame;
wherein the plurality of struts includes a first strut and a second strut, the first strut being configured to traverse a first side of the wearer and the second strut being configured to traverse a second side of the wearer,
wherein each of the plurality of struts is mated to the front carrier frame, such that the weight of the front carrier frame is supported by the plurality of struts, and
wherein the front carrier frame includes an attachment structure configured to secure an item to the front carrier frame.

14. The system of claim 13, wherein the thoracic frame includes an extension frame that is coupled to the plurality of rigid struts.

15. The system of claim 14, wherein the extension frame is configured to allow at least one of the front carrier frame and the plurality of struts to pivot relative to the base support structure.

16. The system of claim 13, wherein the support members of the base support structure are incorporated in a belt.

17. The system of claim 13, wherein the attachment structure is configured to allow secure attachment of a ballistic plate to the front carrier frame.

18. The system of claim 17, wherein the attachment structure is adjustable.

19. The system of claim 13, wherein the system is configured to removably connect a back carrier frame to the system, and to distribute weight from the back carrier frame to the base support structure via the connector member.

20. The system of claim 13, further comprising a back carrier frame connected to at least one of the connector member and the thoracic frame.

* * * * *